US012784431B2

(12) United States Patent
Chen et al.

(10) Patent No.: US 12,784,431 B2
(45) Date of Patent: Nov. 3, 2026

(54) YOLOv8-BASED INDUSTRIAL PIPELINE DEFECT DETECTION METHOD AND SYSTEM

(71) Applicant: ChinaSpecialEquipmentInspection & ResearchInstitute, Beijing (CN)

(72) Inventors: Jinzhong Chen, Beijing (CN); Runkun Lu, Beijing (CN); Chuang Liang, Beijing (CN); Rui Li, Beijing (CN); Xumiao Lv, Beijing (CN); Chang Liu, Beijing (CN); Jiaxing Xin, Beijing (CN); Kuan Fu, Beijing (CN); Yilai Ma, Beijing (CN); Renyang He, Beijing (CN)

(73) Assignee: China Special Equipment Inspection & Research Institute, Beijing (CN)

( * ) Notice: Subject to any disclaimer, the term of this patent is extended or adjusted under 35 U.S.C. 154(b) by 229 days.

(21) Appl. No.: 18/770,879

(22) Filed: Jul. 12, 2024

(65) Prior Publication Data

US 2025/0245977 A1 Jul. 31, 2025

(30) Foreign Application Priority Data

Jan. 26, 2024 (CN) ......................... 202410115510.7

(51) Int. Cl.
*G06V 10/82* (2022.01)
*G06V 10/774* (2022.01)
(Continued)

(52) U.S. Cl.
CPC ............ *G06V 10/82* (2022.01); *G06V 10/774* (2022.01); *G06V 20/50* (2022.01); *G06V 20/70* (2022.01)

(58) Field of Classification Search
CPC ........ G06V 10/82; G06V 20/70; G06V 20/50; G06V 10/774
See application file for complete search history.

(56) References Cited

U.S. PATENT DOCUMENTS 8,838,304 B2 * 9/2014 Xu ...................... B61L 15/0058 701/19
2009/0064069 A1 * 3/2009 Koehl ..................... G06F 30/39 716/119

(Continued)

OTHER PUBLICATIONS

Liu, Yiqing et al, "Gesture Recognition Model Based on YOLOv8-AW", 2023 (Year: 2023).*

(Continued)

*Primary Examiner* — Kevin Ky
(74) *Attorney, Agent, or Firm* — HoustonHogle LLP

(57) ABSTRACT

An improved YOLOv8-based industrial pipeline defect detection method and system are provided. The method includes: acquiring a pipeline surface image; and recognizing a defect position and a defect type in the pipeline surface image by using a pipeline defect detection model. The model is based on an improved YOLOv8 network, which replaces the original means with WIoU loss and a Sophia optimizer during training, and a final model can quickly and accurately recognize the defect position and the defect type in the pipeline surface image. Compared with a conventional YOLOv8 algorithm, training stability, convergence speed, and recognition accuracy are improved by replacing a CIoU loss function with a WIoU loss function. An official AdamW optimizer is replaced with a Sophia optimizer, training time of the model can be greatly shortened, a lot of computing resources can be saved, and less memory is occupied.

16 Claims, 4 Drawing Sheets

(51) Int. Cl.
*G06V 20/50* (2022.01)
*G06V 20/70* (2022.01)

(56) References Cited

U.S. PATENT DOCUMENTS

| | | | | |
|---|---|---|---|---|
| 2025/0078514 | A1* | 3/2025 | Hutchens | G06V 10/82 |
| 2025/0131553 | A1* | 4/2025 | Wu | G06T 7/0004 |
| 2025/0245813 | A1* | 7/2025 | Shukla | G06V 10/764 |
| 2025/0245977 | A1* | 7/2025 | Chen | G06V 20/70 |

OTHER PUBLICATIONS

Liu, Hong et al, "Sophia: A Scalable Stochastic Second-order Optimizer for Language Model Pre-training", submitted May 23, 2023 (Year: 2023).*

* cited by examiner

YOLOv8-BASED INDUSTRIAL PIPELINE DEFECT DETECTION METHOD AND SYSTEM

CROSS-REFERENCE TO RELATED APPLICATION

This patent application claims the benefit and priority of Chinese Patent Application No. 2024101155107 filed with the China National Intellectual Property Administration on Jan. 26, 2024, the disclosure of which is incorporated by reference herein in its entirety as part of the present application.

TECHNICAL FIELD

The present disclosure relates to the technical field of industrial pipeline defect detection, and in particular, to an improved You Only Look Once (YOLO)v8-based industrial pipeline defect detection method and system.

BACKGROUND

Industrial pipelines are widely applied to fields such as petrochemicals, electric power, environmental protection, and public engineering systems, have a crucial impact on the construction of national economy, and bear a heavy responsibility of material transportation in production processes in many fields. Structural aging, natural corrosion, and the like of the industrial pipelines cause defects such as pipeline fatigue cracks, corrosion, creep, and cracking, which lead to safety accidents on occasion, thereby causing significant economic losses and energy waste, as well as environmental problems and casualties. Periodic detection of the industrial pipelines can effectively eliminate potential safety hazards, thereby preventing accidents. Industrial pipeline detection may be classified into external detection and internal detection. The external detection is usually that detectors operate ultrasonic, magnetic particle, and X-ray equipment or instruments to perform sampling detection on part high-risk areas accessible by manpower, which has high detection accuracy but poor comprehensiveness. The internal detection is that a detection robot carries a sensor to scan an interior of an industrial pipeline body, which has slightly low detection precision but can scan the pipeline body comprehensively.

The internal detection of the industrial pipelines has essential differences from the internal detection of other oil and gas pipelines. Detection needs to be performed after a medium is emptied from a pipeline in a shutdown maintenance period. A robot itself cannot push its machine body to travel by using a differential pressure of material transportation, leading to a weak load capacity, so mature electromagnetic non-destructive detection means such as magnetic flux leakage cannot be utilized. Therefore, lightweight detection technologies such as vision have become mainstream methods for the internal detection of the industrial pipelines. In addition, a conventional pipeline vision detection result analysis is manually evaluated, which has low efficiency. Evaluation effects depend on the experience of analysts, the evaluation results vary from person to person, and a unified evaluation scale cannot be formed. YOLO series real-time object visual detection models have been widely applied in the field of industries in recent years, and complete most recognition tasks of object detection in the field of industries. YOLOv8 is the latest and optimal version of this series. An official pre-trained model is obtained by training a universal Common Objects in Context (COCO) dataset. However, there is no industrial pipeline defect data in the COCO dataset. In this special and unconventional industrial scenario, that is, the interior of the industrial pipeline body, actual detection requirements cannot be met by directly applying a standard network architecture. The architecture needs to be pertinently designed and improved to improve the precision of detecting macroscopic defects on an inner surface of an industrial pipeline. With ever-increasing training datasets, training time and the consumption of computing resources need to be included in development costs. In detection networks, optimizers and loss functions that can quickly achieve model convergence and improve detection accuracy become more and more important. This will save a lot of time, manpower, material resources, and financial resources, and improve application and development speed. Therefore, with the pursuit of detection efficiency in practical scenarios, how to reduce the consumption of the computing resources and improve the recognition accuracy becomes a long-term improvement direction in this field in the future.

SUMMARY

An objective of the present disclosure is to provide an improved YOLOv8-based industrial pipeline defect detection method and system, which reduce the consumption of computing resources, and meanwhile, can improve recognition accuracy.

In order to achieve the above-mentioned objective, the present disclosure provides the following solutions.

In an aspect, the present disclosure provides an improved YOLOv8-based industrial pipeline defect detection method, including the following steps:

- acquiring a pipeline surface image; and
- recognizing a defect position and a defect type in the pipeline surface image by using a pipeline defect detection model, where the pipeline defect detection model is a model obtained based on an improved YOLOv8 network; the improved YOLOv8 network includes a defect position detection branch and a defect type detection branch; the defect position detection branch takes Wise Intersection over Union (WIoU) loss as a loss function, and a model parameter of the improved YOLOv8 network is updated by using a Sophia optimizer during training the improved YOLOv8 network.

In one embodiment, training the improved YOLOv8 network includes the following steps:

- acquiring a training dataset, where the training dataset includes a plurality of training data, and each training data includes a pipeline defect image and a corresponding defect label;
- obtaining a network output result by inputting the pipeline defect image of each training data into the improved YOLOv8 network;
- calculating a model detection loss value based on the network output result and the defect label corresponding to the pipeline defect image; and
- updating the model parameter of the improved YOLOv8 network by using the Sophia optimizer according to the model detection loss value.

In one embodiment, the defect label includes a defect box label and a defect type label. The network output result includes a defect box detection result and a defect type detection result.

Calculating the model detection loss value based on the network output result and the defect label specifically includes the following steps:

calculating a position detection loss based on the defect box detection result and the defect box label to obtain position detection loss;

calculating a type detection loss based on the defect type detection result and the defect type label to obtain type detection loss; and calculating the model detection loss value based on the position detection loss and the type detection loss.

In one embodiment, the position detection loss is calculated according to the following formula:

$$L_{WIoUv3} = r(R_{WIoU} L_{IoU}),$$

where, $L_{WIOUv_3}$ is a position detection loss, $R_{WIoU}$ is a distance attention coefficient, $L_{IoU}$ is an Intersection over Union (IoU) loss value, and r is a non-monotonic focusing coefficient.

In one embodiment, the distance attention coefficient is calculated according to the following formula:

$$R_{WIoU} = \exp\left(\frac{(x - x_{gt})^2 + (y - y_{gt})^2}{\left(W_g^2 + H_g^2\right)^*}\right),$$

where, $R_{WIoU}$ is the distance attention coefficient, exp( ) is an exponential operation taking a natural number e as a base number, x is a horizontal ordinate of a center point of the defect box detection result, y is a longitudinal ordinate of the center point of the defect box detection result, $x_{gt}$ is a horizontal ordinate of a center point of the defect box label, $y_{gt}$ is a longitudinal ordinate of the center point of the defect box label, $W_g$ is a width of a minimal bounding rectangle box of the defect box detection result and the defect box label, $H_g$ is a height of the minimal bounding rectangle box of the defect detection result and the defect box label, and $(\bullet)^*$ represents a detach operation.

In one embodiment, the non-monotonic focusing coefficient is calculated according to the following formula:

$$r = \frac{L_{IoU}^* - \overline{L_{IoU}}}{\delta \alpha^{L_{IoU}^* - \overline{L_{IoU}} - \delta}},$$

$$\gamma = \frac{\beta}{\delta \alpha^{\beta - \delta}}, \beta = \frac{L_{IoU}^*}{\overline{L_{IoU}}},$$

where, r is the non-monotonic focusing coefficient, $L_{IoU}^*$ is a detach function value of $L_{IoU}$, $\overline{L_{IoU}}$ is an exponential moving average of $L_{IoU}$, and both α and δ are hyper-parameters.

In one embodiment, the non-monotonic focusing coefficient is calculated according to the following formula:

$$L_{IoU} = 1 - (W_i H_i / S),$$

where, $L_{IoU}$ is the IoU loss value, $W_i$ is a width of an overlap area of the defect box detection result and the defect box label, $H_i$ is a height of the overlap area of the defect box detection result and the defect box label, and S is a sum of an area of the defect box detection result and an area of the defect box label.

In one embodiment, updating the model parameter of the improved YOLOv8 network by using the Sophia optimizer according to the model detection loss value specifically includes the following steps:

calculating a gradient value at a current time step according to the model detection loss value;

obtaining a gradient exponential moving average at the current time step according to the gradient value at the current time step and a gradient exponential moving average at a previous time;

obtaining a Hessian estimation matrix at the current time step according to the loss function of the improved YOLOv8 network at the current time step using a Hessian evaluator;

obtaining a Hessian estimation matrix exponential moving average at the current time step according to the Hessian estimation matrix at the current time step and a Hessian estimation matrix exponential moving average before a preset number of times;

determining a model parameter after decay is generated according to the model parameter of the improved YOLOv8 network at the current time step; and updating the model parameter of the improved YOLOv8 network based on the model parameter after the decay is generated, the gradient exponential moving average, and the Hessian estimation matrix exponential moving average.

In one embodiment, the model parameter of the improved YOLOv8 network is updated according to the following formula:

$$\theta_{t+1} = \theta_t' - \eta \cdot \operatorname{clip}\left(\frac{m_t}{\max(h_t, \epsilon)}, \rho\right),$$

where, $\theta_{t+1}$ is a model parameter of the improved YOLOv8 network at time t+1, $\theta_t'$ is the model parameter after the decay is generated at time t, η is a learning rate, a clip(•,•) function is a clip function, $m_t$ is a gradient exponential moving average at time t, $h_t$ is a Hessian estimation matrix exponential moving average at time t, ∈ is a preset parameter, and ρ is a preset scalar; and the clip function clip(•,•) is as shown in the following formula:

$$\operatorname{clip}(x, y) = \max\{\min\{x, y\}, -y\},$$

where, both x and y are independent variables of the clip function.

In another aspect, corresponding to the foregoing improved YOLOv8-based industrial pipeline defect detection method, the present disclosure further provides an improved YOLOv8-based industrial pipeline defect detection system. The improved YOLOv8-based industrial pipeline defect detection method as described above is performed when the improved YOLOv8-based industrial pipeline defect detection system is run by a computer.

According to specific embodiments provided in the present disclosure, the present disclosure discloses the following technical effects:

According to the improved YOLOv8-based industrial pipeline defect detection method and system provided in the present disclosure, a pipeline surface image is acquired, and a defect position and a defect type in the pipeline surface image are recognized by using a pipeline defect detection model. The pipeline defect detection model is based on an improved YOLOv8 network, and the defect position and the defect type in the pipeline surface image can be quickly and accurately recognized by using this model. Compared with an existing conventional YOLOv8 algorithm, an original Complete IoU (CIoU) loss function is replaced with a WIoU loss function in the present disclosure, which can effectively prevent a case that it is difficult to optimize in a horizontal or vertical direction using a prediction box, thereby improving training stability, and can also directly minimize a distance between a detection box and a target box to improve convergence speed and improve recognition accuracy. Finally, the recognition rate can be improved by 2 to 3% in actual detection. Meanwhile, an original AdamW optimizer is replaced with a Sophia optimizer, Hessian matrix-based cheap stochastic estimation is taken as an estimator, and updating of a model parameter in a worst case is controlled through a limiting mechanism. The adaptability to heterogeneous curvature is stronger, non-convexity and quick change can be resisted better, and moreover, the training time of a model can be greatly shortened, a lot of computing resources can be saved, and memory occupation is less than that of a conventional model using the AdamW optimizer.

In addition, based on the pipeline defect detection model trained by the improved YOLOv8 network, periodic defect detection of the pipeline surface can be realized by inputting the pipeline surface images periodically acquired into this pipeline defect detection model, thereby effectively eliminating pipeline potential safety hazards and preventing accidents timely.

BRIEF DESCRIPTION OF THE DRAWINGS

To describe technical solutions in embodiments of the present disclosure or in the related technology more clearly, the following briefly describes accompanying drawings required for describing the embodiments. Apparently, the accompanying drawings in the following description show merely some embodiments of the present disclosure, and those of ordinary skill in the art may alternatively obtain other drawings from these accompanying drawings without creative efforts.

DETAILED DESCRIPTION OF THE EMBODIMENTS

Technical solutions in the embodiments of the present disclosure will be clearly and completely described below with reference to the drawings in the embodiments of the present disclosure. Apparently, the described embodiments are merely part rather than all embodiments of the present disclosure. On the basis of the embodiments of the present disclosure, all other embodiments obtained by those of ordinary skill in the art without creative work fall within the scope of protection of the present disclosure.

An objective of the present disclosure is to provide an improved YOLOv8-based industrial pipeline defect detection method and system, which reduce the consumption of computing resources, and meanwhile, can improve recognition accuracy.

In order to make the above-mentioned objective, features, and advantages of the present disclosure more apparent and more comprehensible, the present disclosure is further described in detail below with reference to the drawings and specific implementations.

Embodiment 1

Figure 1:
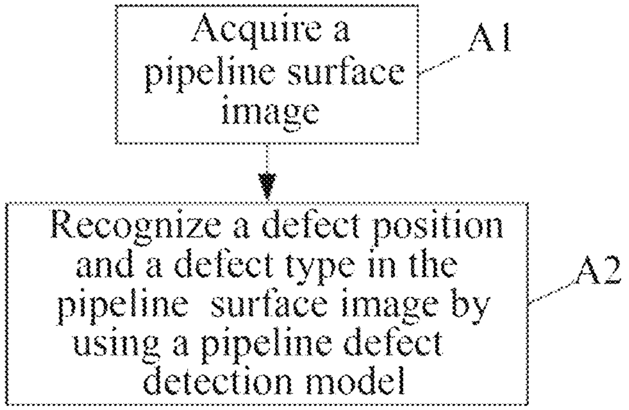
FIG. 1 is a flowchart of an improved YOLOv8-based industrial pipeline defect detection method provided in Embodiment 1 of the present disclosure.

This embodiment provides an improved YOLOv8-based industrial pipeline defect detection method. As the flowchart shown in FIG. 1, the pipeline defect detection method of this embodiment includes steps A1-A3.

A1: a pipeline surface image is acquired. Then, the acquired pipeline surface image is transmitted to a computer, storing a pipeline defect detection model, for recognizing defect position and type of the pipeline.

Specifically, the pipeline surface image can be acquired by an industrial distortion-free camera, which is a key component in the machine vision system. Conventional industrial distortion-free cameras can include CCD (Charge Coupled Device)-based or CMOS (Complementary Metal Oxide Semiconductor)-based cameras.

A2: the pipeline defect detection model is constructed in the computer. The pipeline defect detection model is a model obtained based on an improved YOLOv8 network. The improved YOLOv8 network includes a defect position detection branch and a defect type detection branch. The defect position detection branch takes WIoU loss as a loss function. A model parameter of the improved YOLOv8 network is updated by using a Sophia optimizer during training the improved YOLOv8 network. Specifically, a training dataset is constructed, including a plurality of pipeline defect images and a plurality of corresponding defect labels. The improved YOLOv8 network is trained on the training dataset so as to obtain the pipeline defect detection model.

A3: a defect position and a defect type in the pipeline surface image are recognized by using the pipeline defect detection model. Based on the recognized defect position and defect type, a decision-making basis is provided to industrial pipeline inspectors for identifying whether there are hidden risks in the pipeline, thereby preventing accidents timely.

Wise Intersection over Union (WIoU), also known as Wise-IoU, is capable of solving a Bounding Box Regression (BBR) balance problem between samples with good and poor quality. A loss function of the BBR is crucial for object detection, and good definition of the loss function will bring significant performance improvement to the model. In most of existing work, it is assumed that samples in training data are of high quality, and focuses on enhancing the fitting capacity of BBR loss. Localization performance will be endangered if the BBR of a low-quality sample is enhanced blindly. Focal Efficient IoU (EIoU) v1 is proposed to solve this problem. However, due to a static Focusing Mechanism (FM) of the Focal EIoU v1, the potential of a non-monotonic FM is not fully utilized. An attention-based loss WIoU v1 of the BBR is proposed, which achieves lower regression errors than that of the most advanced SCYLLA-IoU (SIoU) in simulation experiments. Meanwhile, WIoU v2 with a monotonic FM and WIoU v3 with a dynamic non-monotonic FM are designed. The WIoU v3 achieves superior performance by using the Wise gradient gain allocation policy with the dynamic non-monotonic FM.

The Sophia optimizer is a light-weight second-order optimizer, which takes cheap stochastic estimation of a Hessian diagonal as a pre-regulator, and controls an update magnitude in a worst case through a limiting mechanism. The Sophia optimizer uses a small batch of examples every k steps to estimate diagonal entries of a Hessian matrix of loss, and considers two choices for diagonal Hessian estimators: (1) using an unbiased estimator with a running time equal to a time that a mini-batch gradient reaches a constant factor; and (2) using a biased estimator, which performs mini-batch gradient calculation by resampling a label. Two estimators only introduce 5% of overhead in each step (on average). In each step, Sophia updates a model parameter by dividing an Exponential Moving Average (EMA) of gradients by an EMA of the diagonal Hessian estimation matrix, and then clipping by using a scalar, that is, by using a clip function clip ( ). On pre-training language models, such as a Generative Pre-Trained Transformer-2 (GPT-2), the Sophia optimizer has 50% fewer steps than the AdamW optimizer and achieves the same pre-training loss. The memory and average time of each step of the Sophia optimizer almost remain at 50% of those of the AdamW optimizer, so it can be said that the total time of the Sophia optimizer is shortened by 50%.

Figure 2:
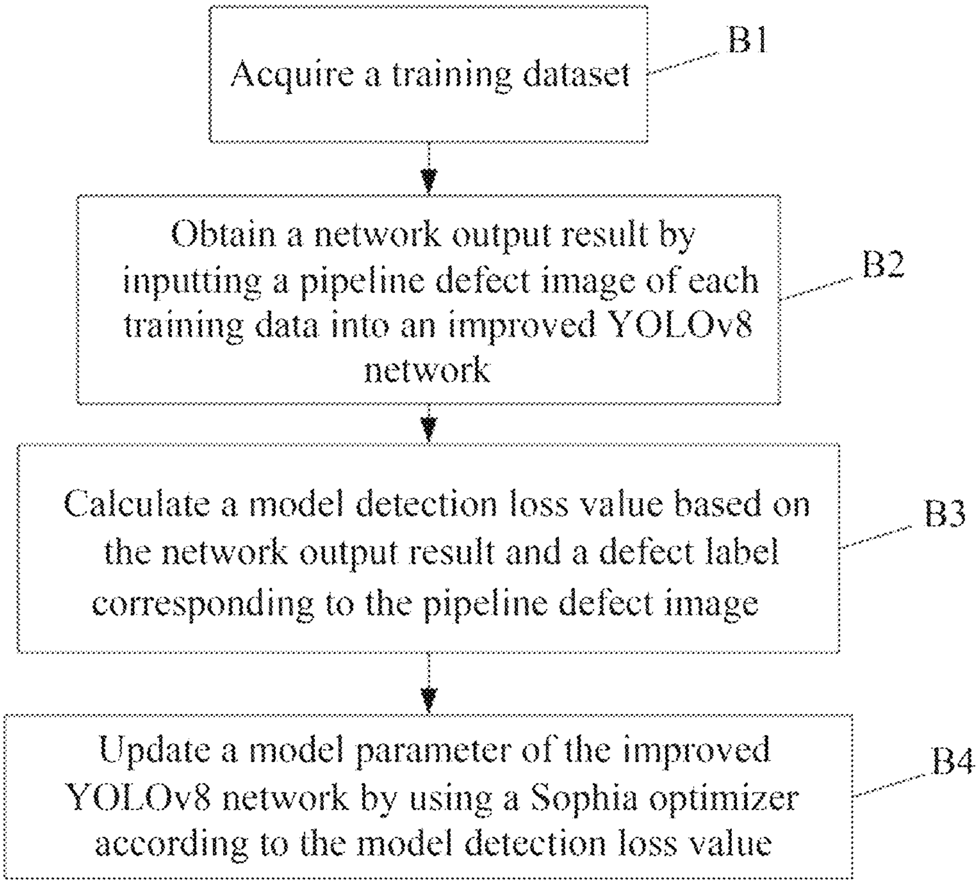
FIG. 2 is a flowchart of a training process of an improved YOLOv8 network in the industrial pipeline defect detection method provided in Embodiment 1 of the present disclosure.

Specifically, in this embodiment, as the flowchart shown in FIG. 2, based on multiple pipeline defect images captured by the industrial distortion-free camera, the improved YOLOv8 network is trained on the computer. A training process of the improved YOLOv8 network includes steps B1 to B4:

B1: a training dataset is acquired. The training dataset includes a plurality of training data, and each training data includes a pipeline defect image and a corresponding defect label.

B2: the pipeline defect image of each training data is input into an improved YOLOv8 network to obtain a network output result. The network output result includes defect position prediction box coordinates and a defect type one-hot representation probability value.

B3: a model detection loss value is calculated based on the network output result and a defect label corresponding to the pipeline defect image.

B4: a model parameter of the improved YOLOv8 network is updated by using a Sophia optimizer according to the model detection loss value.

For the training data during a pipeline defect detection, the defect label includes a defect box label and a defect type label, that is, a defect position in each pipeline defect image is subjected to box selection and labeling, and a defect type is subjected to labeling. Correspondingly, the network output result output by an improved YOLOv8 network-based pipeline defect detection model includes a defect box detection result and a defect type detection result, which respectively represent detection results of the defect position and the defect type of on the input image from the pipeline defect detection model.

Figure 3:
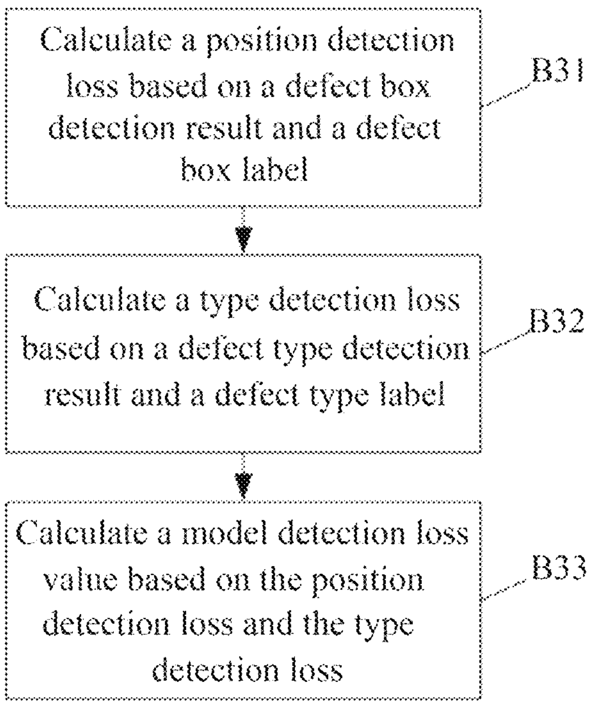
FIG. 3 is a flowchart of step B3 in the industrial pipeline defect detection method provided in Embodiment 1 of the present disclosure.

Specifically, in this embodiment, as the flowchart shown in FIG. 3, step B3 that a model detection loss value is calculated based on the network output result and a defect label corresponding to the pipeline defect image includes steps B31-B33.

B31: a position detection loss is calculated based on a defect box detection result and a defect box label. Specifically, the position detection loss is calculated according to the following formula:

$$L_{WIoUv3} = r(R_{WIoU} L_{IoU}),$$

where, $L_{WIOUv_3}$ is a position detection loss, $R_{WIoU}$ is a distance attention coefficient, $L_{IoU}$ is an IoU loss value, and r is a non-monotonic focusing coefficient.

Figure 4:
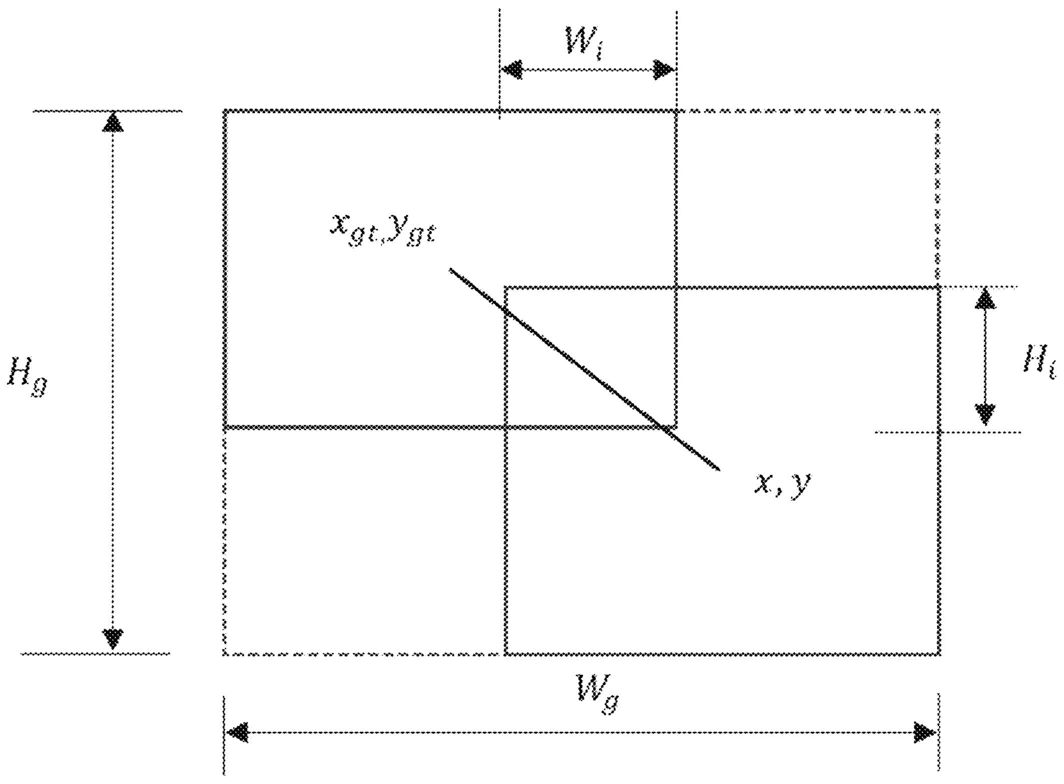
FIG. 4 is a schematic diagram of IoU in the industrial pipeline defect detection method provided in Embodiment 1 of the present disclosure.

The distance attention coefficient $R_{WIoU}$ can amplify the IoU of an ordinary quality defect anomaly anchor box, and improve the overall performance of a detector. The distance attention coefficient can be calculated according to the following formula:

$$R_{WIoU} = \exp\left(\frac{(x - x_{gt})^2 + (y - y_{gt})^2}{(W_g^2 + H_g^2)^*}\right),$$

where, $R_{WIoU}$ is the distance attention coefficient, exp( ) is an exponential operation taking a natural number e as a base number, as the IoU schematic diagram shown in FIG. 4, x is a horizontal ordinate of a center point of the defect box detection result, y is a longitudinal ordinate of the center point of the defect box detection result, $x_{gt}$ is a horizontal ordinate of a center point of the defect box label, $y_{gt}$ is a longitudinal ordinate of the center point of the defect box label, $W_g$ is a width of a minimal bounding rectangle box of the defect box detection result and the defect box label, $H_g$ is a height of the minimal bounding rectangle box of the defect detection result and the defect box label, and (•)* represents a detach operation, which represents an operation of separating from a calculation chart during network back-propagation, that is, the operation that does not need to calculate a gradient.

The non-monotonic focusing coefficient may be calculated according to the following formula:

$$r = \frac{L_{IoU}^* - \overline{L_{IoU}}}{\delta \alpha^{L_{IoU}^* - \overline{L_{IoU}} - \delta}},$$

$$\gamma = \frac{\beta}{\delta \alpha^{\beta - \delta}}, \beta = \frac{L_{IoU}^*}{\overline{L_{IoU}}},$$

where, r is the non-monotonic focusing coefficient, $L_{IoU}^*$ is a detach function value of $L_{IoU}$, $\overline{L_{IoU}}$ is an exponential moving average of $L_{IoU}$, and both α and δ are hyper-parameters.

The non-monotonic focusing coefficient may be calculated according to the following formula:

$$L_{IoU} = 1 - (W_i H_i / S),$$

where, $L_{IoU}$ is the IoU loss value, $W_i$ is a width of an overlap area of the defect box detection result and the defect box label, $H_i$ is a height of the overlap area of the defect box detection result and the defect box label, and S is a sum of an area of the defect box detection result and an area of the defect box label.

B32: a type detection loss is calculated based on a defect type detection result and a defect type label.

B33: a model detection loss value is calculated according to the position detection loss and the type detection loss. In this embodiment, only the loss function of a defect position detection branch, that is, a Bbox_Loss branch, is replaced, the loss function of a defect type detection branch, that is, a Cls_Loss branch is not changed. After a WIoU loss value of the Bbox_Loss branch is calculated, the WIoU loss value of the Bbox_Loss branch is added to the unchanged loss function value of the Cls_Loss branch to obtain a total loss function $L_t(\theta_t)$ of the improved YOLOv8 network.

Figure 5:
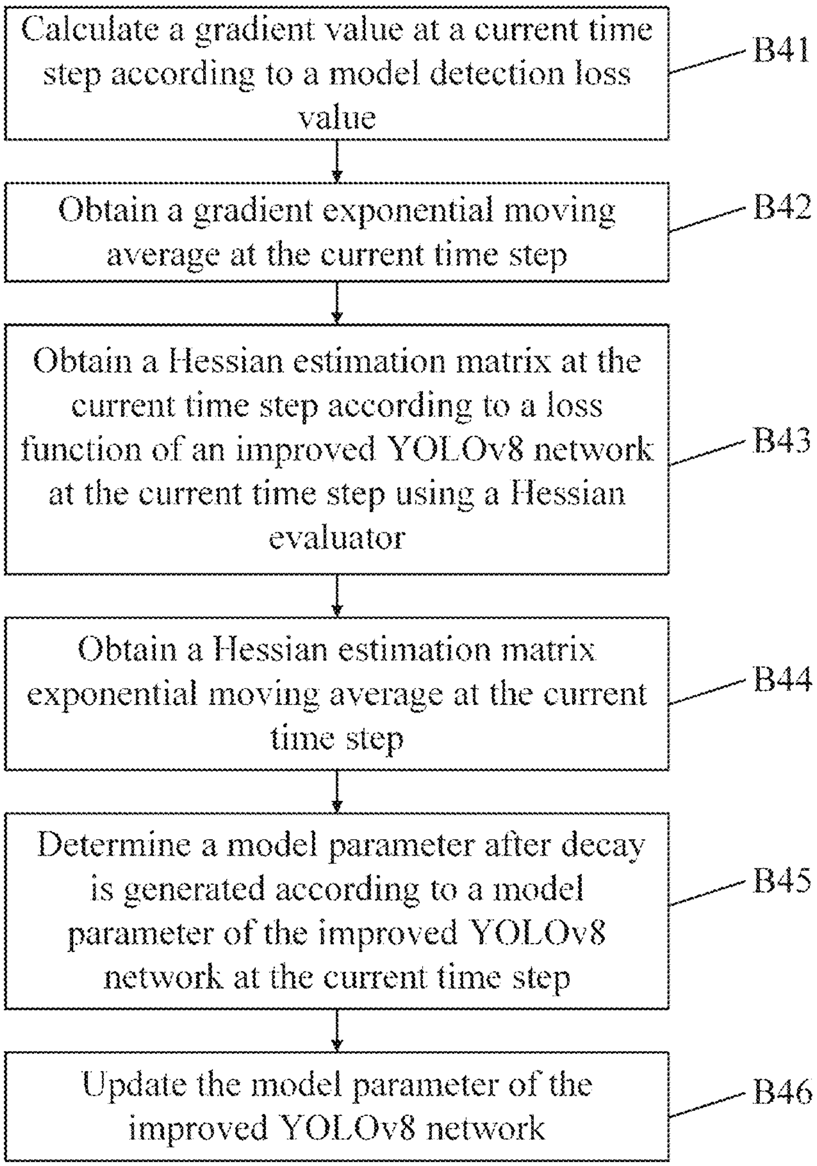
FIG. 5 is a flowchart of step B4 in the industrial pipeline defect detection method provided in Embodiment 1 of the present disclosure.

Specifically, as the flowchart shown in FIG. 5, step B4 that a model parameter of the improved YOLOv8 network is updated by using the Sophia optimizer according to the model detection loss value includes steps B41 to B46.

B41: a gradient value at a current time step is calculated according to the model detection loss value. Before that, initial values of various parameters are defined first, for example, setting values of a learning rate $\eta$ and various hyper-parameters $\lambda$, $\beta 1$, $\beta 2$, and $\in$, a type of a Hessian evaluator (e.g., Hutchinson (a Hutchinson algorithm, an unbiased estimator) or Gauss-Newton-Bartlett (Gauss-Newton iteration method, a biased estimator)), setting a gradient exponential moving average at an initial time $m_0=0$, a Hessian estimation matrix exponential moving average $h_{1-k}=0$, and setting an initial time t=0, subscript t of each t-related parameter in the algorithms may alternatively represent that mini-batch image data is input for the $t^{th}$ time to perform weight parameter updating for the $t^{th}$ time.

B42: a gradient exponential moving average at the current time step is obtained. Specifically, the gradient exponential moving average at the current time step is obtained according to the gradient value at the current time step and a gradient exponential moving average at a previous time. At each time t, a loss $L_t(\theta_t)$ of mini-batch data is calculated, a gradient $g_t=\nabla L_t(\theta_t)$ is calculated, and the gradient exponential moving average $m_t$ is obtained through $\beta_1 m_{t-1}+(1-\beta_1)g_t$.

B43: a Hessian estimation matrix at the current time step is obtained according to the loss function of the improved YOLOv8 network at the current time step using a Hessian evaluator. The Hessian estimation matrix is a diagonal matrix obtained through a Hessian Estimator $(\theta_t)$, which includes curvature information of the loss function.

B44: a Hessian estimation matrix exponential moving average at the current time step is obtained. Specifically, the Hessian estimation matrix exponential moving average at the current time step is obtained according to the Hessian estimation matrix at the current time step and an exponential moving average of Hessian estimation matrices before a preset number of times. If the current time step t is indivisible by k, $h_t=h_{t-1}$. If the current time step t is divisible by k, $h_t$ is calculated and updated through $\beta_2 h_{t-k}+(1-\beta_2)$Estimator $(\theta_t)$. Second-order optimization processing of the Estimator in this step can make the loss function find a local minimum value more easily.

B45: a model parameter after decay is generated is determined according to the model parameter of the improved YOLOv8 network at the current time step. In this embodiment, the model parameter after decay is generated is determined according to the following formula.

$$\theta_t' = \theta_t - \eta\lambda\theta_t.$$

B46: the model parameter of the improved YOLOv8 network is updated. Specifically, the model parameter of the improved YOLOv8 network is updated based on the model parameter after the decay is generated, the gradient exponential moving average, and the Hessian estimation matrix exponential moving average. Specifically, the model parameter of the improved YOLOv8 network is updated according to the following formula:

$$\theta_{t+1} = \theta_t' - \eta \cdot \text{clip}\left(\frac{m_t}{\max(h_t, \epsilon)}, \rho\right),$$

where, $\theta_{t+1}$ is a model parameter of the improved YOLOv8 network at time t+1, $\theta_t'$ is the model parameter after the decay is generated at time t, $\eta$ is a learning rate, a clip(•,•) function is a clip function, $m_t$ is a gradient exponential moving average at time t, $h_t$ is a Hessian estimation matrix exponential moving average at time t, $\in$ is a preset parameter, and $\rho$ is a preset scalar. The clip function is as shown in the following formula:

$$\text{clip}(x, y) = \max\{\min\{x, y\}, -y\},$$

where, both x and y are independent variables of the clip function.

The following proves that the pipeline defect detection method provided in this embodiment has superiority in combination with a specific experimental example. The dataset used in an experiment comes from detection videos of a pipeline inspection on site. About 5500 pipeline defect images are captured in total. There are 5210 images in the training dataset. 274 (5%) images are selected randomly from the training dataset for validation. There are 9 defect anomaly types, which are specifically shown in the following table:

TABLE 1

Correspondence of defect types and labels

| Defect type label | Defect anomaly type |
|---|---|
| 0 | Wax precipitation and coking |
| 1 | Sediment (solid and liquid) |
| 2 | Foreign objects (small stones, hard pieces, and the like) |
| 3 | Corrosion |
| 4 | Pock marks |
| 5 | Tee joint |
| 6 | Connecting pipe |
| 7 | External equipment (e.g., thermocouple, pressure gauge) |
| 8 | Others (dried stains and the like) |

The model used for training is from the latest pre-training model of YOLO official. Models of three scales, s, m, and l, that is, models of three scales, small, medium, and large, are selected. The scale describes the number of parameter weights of the model. A training parameter "epoch" is set as 300, and a parameter "patience" is 30. The model with the best effect is tested by replacing an optimizer (AdamW or Sophia or AdamW+SGD) and an IoU loss function (CIoU or WIoU). The WIoU adopts a WIoUv3 version. In the experiment, if it is found that a change item does not have an improvement effect, this change item is removed in a next experiment, and optimal parameters of the previous experiment are changed back.

Results of this experiment are evaluated by using an mAP@50 tool. In object detection of a plurality of categories, a curve can be drawn for each category according to a recall rate and precision rate. AP is the area under this curve, mAP is an average of the area under P-R curves of all categories, and mAP represents the recognition accuracy. In table 2, "auto" represents that the optimizer in the first 10000 iterations during YOLOv8 training uses AdamW, after which Stochastic Gradient Descent (SGD) is used.

TABLE 2

Experimental results

| Scale | YOLOv8mAP (s = 11.1M, m = 25.9M, l = 43.6M) | |
|---|---|---|
| s | auto + CIoU | 0.840 |
| | Sophia + WIoU | 0.870 |
| m | auto + CIoU | 0.849 |
| | Sophia + WIoU | 0.870 |
| l | auto + CIoU | 0.813 |
| | Sophia + WIoU | 0.822 |

According to the improved YOLOv8-based industrial pipeline defect detection method provided in this embodiment, a pipeline defect detection model is obtained based on a YOLOv8 network improved through WIoU loss and a Sophia optimizer. A defect position and a defect type in a pipeline surface image can be quickly and accurately recognized by using this model. Compared with an existing conventional YOLOv8 algorithm, an original CIoU loss function is replaced with a WIoU loss function in this embodiment, which can effectively prevent a case that it is difficult to optimize in a horizontal or vertical direction using a prediction box, to improve training stability, and can also directly minimize a distance between a detection box and a target box to improve convergence speed and improve recognition accuracy. Finally, the recognition rate can be improved by 2 to 3% in actual detection. Meanwhile, an original AdamW optimizer is replaced with a Sophia optimizer, Hessian matrix-based cheap stochastic estimation is taken as an estimator, and updating of a model parameter in a worst case is controlled through a limiting mechanism. The adaptability to heterogeneous curvature is stronger, non-convexity and quick change can be resisted better, and moreover, the training time of a model can be greatly shortened, a lot of computing resources can be saved, and memory occupation is less than that of a conventional model using the AdamW optimizer.

Embodiment 2

Figure 6:
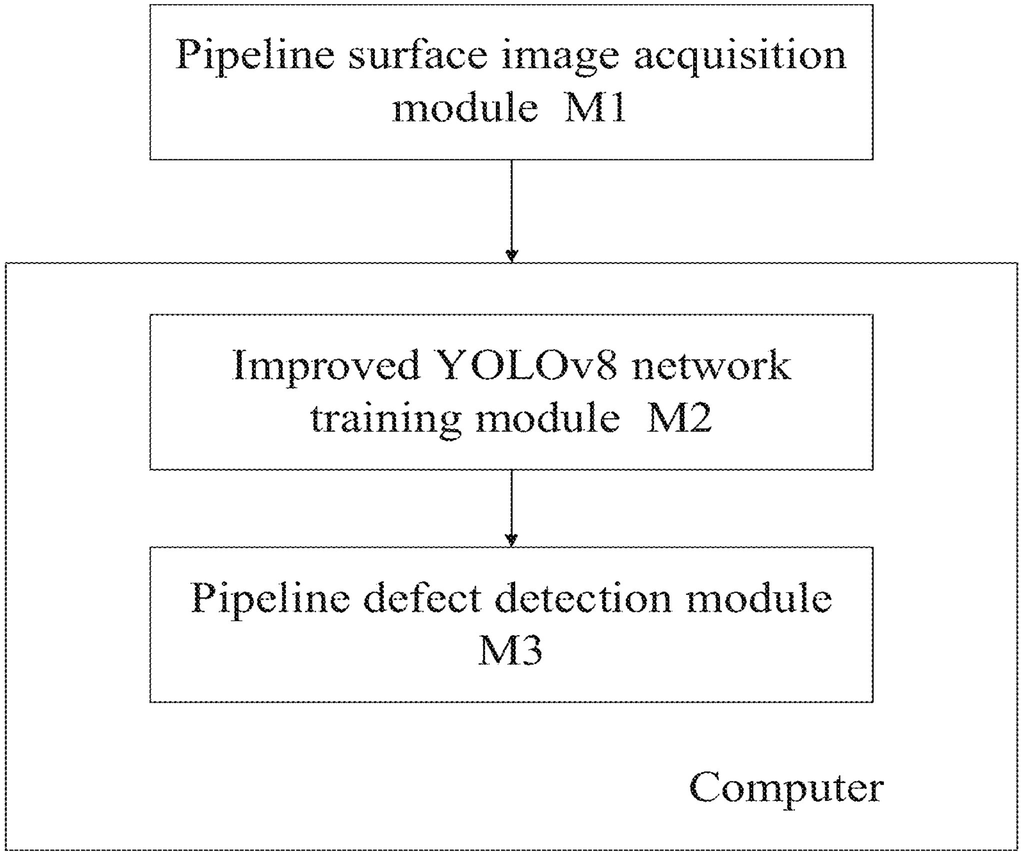
FIG. 6 is a schematic structural diagram of an improved YOLOv8-based industrial pipeline defect detection system provided in Embodiment 2 of the present disclosure.

In addition, the method in Embodiment 1 of the present disclosure may alternatively be implemented by means of architecture of an improved YOLOv8-based industrial pipeline defect detection system as shown in FIG. 6. As shown in FIG. 6, the improved YOLOv8-based industrial pipeline defect detection system may include a pipeline surface image acquisition module M1, an improved YOLOv8 network training module M2, and a pipeline defect detection module M3. The pipeline surface image acquisition module M1 includes an industrial distortion-free camera for acquiring a pipeline surface image. The improved YOLOv8 network training module M2 and pipeline defect detection module M3 are stored in a computer connected with the module M1 by a bus. The improved YOLOv8 network training module M2 includes an improved YOLOv8 network to be trained for constructing a pipeline defect detection model. The pipeline defect detection module M3 consists of the pipeline defect detection model obtained from the improved YOLOv8 network training module M2, for recognizing a defect position and a defect type in the pipeline surface image, so as to effectively eliminate pipeline potential safety hazards and prevent accidents timely. Some modules may alternatively have subunits for realizing functions thereof. For example, the improved YOLOv8 network training module M2 may alternatively include a training data acquisition unit, a model detection loss calculation unit, a model parameter optimization unit, an exponential moving average calculation unit, and a model decay parameter determination unit. Certainly, the architecture shown in FIG. 6 is only exemplary. One or at least two components in the system as shown in FIG. 6 may be omitted according to actual needs when different functions are realized.

Specific examples are applied herein, but the above descriptions only describe the principles and implementations of the present disclosure. The descriptions of the above embodiments are only used to help understand the method and the core idea of the present disclosure. Those skilled in the art should understand that the various modules or steps of the present disclosure described above can be implemented by a general-purpose computer apparatus. Optionally, they can be implemented by program code executable by the computing apparatus, can be stored in a storage device and executed by the computing apparatus, or can be separately made into various integrated circuit modules, or a plurality of modules or steps thereof may be made into a single integrated circuit module for implementing. The present disclosure is not limited to the combination of any specific hardware and software.

Meanwhile, for those of ordinary skill in the art, there will be changes in the specific implementation mode and application scope according to the idea of the present disclosure. In conclusion, the content of this specification is not to be construed as a limitation to the present disclosure.

What is claimed is:

1. An improved You Only Look Once (YOLO)v8-based industrial pipeline defect detection method, comprising:

acquiring a pipeline surface image; and recognizing a defect position and a defect type in the pipeline surface image by using a pipeline defect detection model, the pipeline defect detection model being a model obtained based on an improved YOLOv8 network, the improved YOLOv8 network comprising a defect position detection branch and a defect type detection branch, the defect position detection branch taking Wise Intersection over Union (WIOU) loss as a loss function, and a model parameter of the improved YOLOv8 network being updated by using a Sophia optimizer during training the improved YOLOv8 network, wherein training the improved YOLOv8 network comprises:

acquiring a training dataset, the training dataset comprising a plurality of training data, and each training data of the plurality of training data comprising a pipeline defect image and a defect label corresponding to the pipeline defect image;

obtaining a network output result by inputting the pipeline defect image of each training data into the improved YOLOv8 network;

calculating a model detection loss value based on the network output result and the defect label; and updating the model parameter of the improved YOLOv8 network by using the Sophia optimizer according to the model detection loss value.

2. The improved YOLOv8-based industrial pipeline defect detection method according to claim 1, wherein the defect label comprises a defect box label and a defect type label;

the network output result comprises a defect box detection result and a defect type detection result; and calculating the model detection loss value based on the network output result and the defect label corresponding to the pipeline defect image comprises:

calculating a position detection loss based on the defect box detection result and the defect box label;

calculating a type detection loss based on the defect type detection result and the defect type label; and calculating the model detection loss value based on the position detection loss and the type detection loss.

3. The improved YOLOv8-based industrial pipeline defect detection method according to claim 2, wherein the position detection loss is calculated according to the following formula:

$$L_{WIoUv3} = r(R_{WIoU} L_{IoU}),$$

where $L_{WIoUv_3}$ is a position detection loss, $R_{WIoU}$ is a distance attention coefficient, $L_{IoU}$ is an Intersection over Union (IoU) loss value, and r is a non-monotonic focusing coefficient.

4. The improved YOLOv8-based industrial pipeline defect detection method according to claim 3, wherein the distance attention coefficient is calculated according to the following formula:

$$R_{WIoU} = \exp\left(\frac{(x - x_{gt})^2 + (y - y_{gt})^2}{(W_g^2 + H_g^2)^*}\right),$$

where $R_{WIoU}$ is the distance attention coefficient, exp ( ) is an exponential operation taking a natural number e as a base number, x is a horizontal ordinate of a center point of the defect box detection result, y is a longitudinal ordinate of the center point of the defect box detection result, $x_{gt}$ is a horizontal ordinate of a center point of the defect box label, $y_{gt}$ is a longitudinal ordinate of the center point of the defect box label, $W_g$ is a width of a minimal bounding rectangle box of the defect box detection result and the defect box label, $H_g$ is a height of the minimal bounding rectangle box of the defect detection result and the defect box label, and $(\cdot)^*$ represents a detach operation.

5. The improved YOLOv8-based industrial pipeline defect detection method according to claim 3, wherein the non-monotonic focusing coefficient is calculated according to the following formula:

$$r = \frac{L_{IoU}^* - \overline{L_{IoU}}}{\delta \alpha^{L_{IoU}^* - \overline{L_{IoU}} - \delta}},$$

$$\gamma = \frac{\beta}{\delta \alpha^{\beta - \delta}},$$

$$\beta = \frac{L_{IoU}^*}{\overline{L_{IoU}}},$$

where r is the non-monotonic focusing coefficient, $L_{IoU}^*$ is a detach function value of $L_{IoU}$, $\overline{L_{IoU}}$ is an exponential moving average of $L_{IoU}$, and both α and δ are hyper-parameters.

6. The improved YOLOv8-based industrial pipeline defect detection method according to claim 3, wherein the IoU loss value is calculated according to the following formula:

$$L_{IoU} = 1 - (W_i H_i / S),$$

where $L_{IoU}$ is the IoU loss value, $W_i$ is a width of an overlap area of the defect box detection result and the defect box label, $H_i$ is a height of the overlap area of the defect box detection result and the defect box label, and S is a sum of an area of the defect box detection result and an area of the defect box label.

7. The improved YOLOv8-based industrial pipeline defect detection method according to claim 1, wherein updating the model parameter of the improved YOLOv8 network by using the Sophia optimizer according to the model detection loss value comprises:

calculating a gradient value at a current time step according to the model detection loss value;

obtaining a gradient exponential moving average at the current time step according to the gradient value at the current time step and a gradient exponential moving average at a previous time;

obtaining a Hessian estimation matrix at the current time step according to the loss function of the improved YOLOv8 network at the current time step using a Hessian evaluator;

obtaining a Hessian estimation matrix exponential moving average at the current time step according to the Hessian estimation matrix at the current time step and a Hessian estimation matrix exponential moving average before a preset number of times;

determining a model parameter after decay is generated according to the model parameter of the improved YOLOv8 network at the current time step; and updating the model parameter of the improved YOLOv8 network based on the model parameter after the decay is generated, the gradient exponential moving average, and the Hessian estimation matrix exponential moving average.

8. The improved YOLOv8-based industrial pipeline defect detection method according to claim 7, wherein the model parameter of the improved YOLOv8 network is updated according to the following formula:

$$\theta_{t+1} = \theta_t' - \eta \cdot \text{clip}\left(\frac{m_t}{\max(h_t, \epsilon)}, \rho\right),$$

where $\theta_{t+1}$ is a model parameter of the improved YOLOv8 network at time t+1, $\theta_t'$ is the model parameter after the decay is generated at time t, $\eta$ is a learning rate, a clip (•,•) function is a clip function, $m_t$ is a gradient exponential moving average at time t, $h_t$ is a Hessian estimation matrix exponential moving average at time t, $\epsilon$ is a preset parameter, and $\rho$ is a preset scalar; and the clip function is as shown in the following formula:

$$\text{clip}(x, y) = \max\{\min\{x, y\}, -y\},$$

where both x and y are independent variables of the clip function.

9. An improved YOLOv8-based industrial pipeline defect detection system, wherein when the improved YOLOv8-based industrial pipeline defect detection system is run by a computer, the improved YOLOv8-based industrial pipeline defect detection system performs:

acquiring a pipeline surface image; and recognizing a defect position and a defect type in the pipeline surface image by using a pipeline defect detection model, the pipeline defect detection model being a model obtained based on an improved YOLOv8 network, the improved YOLOv8 network comprising a defect position detection branch and a defect type detection branch, the defect position detection branch taking Wise Intersection over Union (WIOU) loss as a loss function, and a model parameter of the improved YOLOv8 network being updated by using a Sophia optimizer during training the improved YOLOv8 network, wherein training the improved YOLOv8 network comprises:

acquiring a training dataset, the training dataset comprising a plurality of training data, and each training data of the plurality of training data comprising a pipeline defect image and a defect label corresponding to the pipeline defect image;

obtaining a network output result by inputting the pipeline defect image of each training data into the improved YOLOv8 network;

calculating a model detection loss value based on the network output result and the defect label; and updating the model parameter of the improved YOLOv8 network by using the Sophia optimizer according to the model detection loss value.

10. The improved YOLOv8-based industrial pipeline defect detection system according to claim 9, wherein the defect label comprises a defect box label and a defect type label;

the network output result comprises a defect box detection result and a defect type detection result; and calculating the model detection loss value based on the network output result and the defect label corresponding to the pipeline defect image comprises:

calculating a position detection loss based on the defect box detection result and the defect box label;

calculating a type detection loss based on the defect type detection result and the defect type label; and calculating the model detection loss value based on the position detection loss and the type detection loss.

11. The improved YOLOv8-based industrial pipeline defect detection system according to claim 10, wherein the position detection loss is calculated according to the following formula:

$$L_{WIoUv3} = r(R_{WIoU} L_{IoU}),$$

where $L_{WIoUv_3}$ is a position detection loss, $R_{WIoU}$ is a distance attention coefficient, $L_{IoU}$ is an Intersection over Union (IoU) loss value, and r is a non-monotonic focusing coefficient.

12. The improved YOLOv8-based industrial pipeline defect detection system according to claim 11, wherein the distance attention coefficient is calculated according to the following formula:

$$R_{WIoU} = \exp\left(\frac{(x - x_{gt})^2 + (y - y_{gt})^2}{\left(W_g^2 + H_g^2\right)^*}\right),$$

where $R_{WIoU}$ is the distance attention coefficient, exp ( ) is an exponential operation taking a natural number e as a base number, x is a horizontal ordinate of a center point of the defect box detection result, y is a longitudinal ordinate of the center point of the defect box detection result, $x_{gt}$ is a horizontal ordinate of a center point of the defect box label, $y_{gt}$ is a longitudinal ordinate of the center point of the defect box label, $W_g$ is a width of a minimal bounding rectangle box of the defect box detection result and the defect box label, $H_g$ is a height of the minimal bounding rectangle box of the defect detection result and the defect box label, and $(\bullet)^*$ represents a detach operation.

13. The improved YOLOv8-based industrial pipeline defect detection system according to claim 11, wherein the non-monotonic focusing coefficient is calculated according to the following formula:

$$r = \frac{L_{IoU}^* - \overline{L_{IoU}}}{\delta \alpha^{L_{IoU}^* - \overline{L_{IoU}} - \delta}},$$

$$\gamma = \frac{\beta}{\delta \alpha^{\beta - \delta}},$$

$$\beta = \frac{L_{IoU}^*}{\overline{L_{IoU}}},$$

where r is the non-monotonic focusing coefficient, $L_{IoU}^*$ is a detach function value of $L_{IoU}$, $\overline{L_{IoU}}$ is an exponential moving average of $L_{IoU}$, and both $\alpha$ and $\delta$ are hyper-parameters.

14. The improved YOLOv8-based industrial pipeline defect detection system according to claim 11, wherein the IoU loss value is calculated according to the following formula:

$$L_{IoU} = 1 - \left(W_i H_i / S\right),$$

where $L_{IoU}$ is the IoU loss value, $W_i$ is a width of an overlap area of the defect box detection result and the defect box label, $H_i$ is a height of the overlap area of the defect box detection result and the defect box label, and S is a sum of an area of the defect box detection result and an area of the defect box label.

15. The improved YOLOv8-based industrial pipeline defect detection system according to claim 9, wherein updating the model parameter of the improved YOLOv8 network by using the Sophia optimizer according to the model detection loss value comprises:

calculating a gradient value at a current time step according to the model detection loss value;

obtaining a gradient exponential moving average at the current time step according to the gradient value at the current time step and a gradient exponential moving average at a previous time;

obtaining a Hessian estimation matrix at the current time step according to the loss function of the improved YOLOv8 network at the current time step using a Hessian evaluator;

obtaining a Hessian estimation matrix exponential moving average at the current time step according to the Hessian estimation matrix at the current time step and a Hessian estimation matrix exponential moving average before a preset number of times;

determining a model parameter after decay is generated according to the model parameter of the improved YOLOv8 network at the current time step; and updating the model parameter of the improved YOLOv8 network based on the model parameter after the decay is generated, the gradient exponential moving average, and the Hessian estimation matrix exponential moving average.

16. The improved YOLOv8-based industrial pipeline defect detection system according to claim 15, wherein the model parameter of the improved YOLOv8 network is updated according to the following formula:

$$\theta_{t+1} = \theta_t' - \eta \cdot \text{clip}\left(\frac{m_t}{\max(h_t, \epsilon)}, \rho\right),$$

where $\theta_{t+1}$ is a model parameter of the improved YOLOv8 network at time t+1, $\theta_t'$ is the model parameter after the decay is generated at time t, $\eta$ is a learning rate, a clip(•,•) function is a clip function, $m_t$ is a gradient exponential moving average at time t, $h_t$ is a Hessian estimation matrix exponential moving average at time t, $\epsilon$ is a preset parameter, and $\rho$ is a preset scalar; and the clip function is as shown in the following formula:

$$\text{clip}(x, y) = \max\{\min\{x, y\}, -y\},$$

where both x and y are independent variables of the clip function.

* * * * *